United States Patent
Vincent et al.

(10) Patent No.: US 9,895,679 B2
(45) Date of Patent: Feb. 20, 2018

(54) PROCESS FOR REJUVENATING HYDROTREATING CATALYSTS

(71) Applicant: CATALYST RECOVERY EUROPE S.A., Rodange (LU)

(72) Inventors: Guillaume Vincent, Malling (FR); James Dallas Seamans, The Woodlands, TX (US)

(73) Assignee: CATALYST RECOVERY EUROPE S.A., Rodange (LU)

( * ) Notice: Subject to any disclaimer, the term of this patent is extended or adjusted under 35 U.S.C. 154(b) by 0 days.

(21) Appl. No.: 15/304,368

(22) PCT Filed: Apr. 16, 2015

(86) PCT No.: PCT/EP2015/058300
§ 371 (c)(1),
(2) Date: Oct. 14, 2016

(87) PCT Pub. No.: WO2015/158844
PCT Pub. Date: Oct. 22, 2015

(65) Prior Publication Data
US 2017/0036196 A1    Feb. 9, 2017

(30) Foreign Application Priority Data
Apr. 16, 2014   (LU) .......................................... 92429

(51) Int. Cl.
| | | |
|---|---|---|
| *B01J 23/94* | (2006.01) | |
| *B01J 37/20* | (2006.01) | |
| *B01J 38/02* | (2006.01) | |
| *B01J 38/12* | (2006.01) | |
| *B01J 38/62* | (2006.01) | |
| *B01J 23/882* | (2006.01) | |
| *B01J 23/883* | (2006.01) | |

(52) U.S. Cl.
CPC ............. *B01J 23/94* (2013.01); *B01J 23/882* (2013.01); *B01J 23/883* (2013.01); *B01J 37/20* (2013.01); *B01J 38/02* (2013.01); *B01J 38/12* (2013.01); *B01J 38/62* (2013.01)

(58) Field of Classification Search
CPC ...... B01J 38/485; B01J 23/882; B01J 23/883; B01J 23/28; B01J 23/90; B01J 23/92; B01J 23/94; B01J 37/0201; B01J 37/20; B01J 37/28; B01J 38/02; B01J 38/12; B01J 38/16; B01J 38/60; C10G 45/08; C10G 2300/202; C10G 2300/70
USPC ................ 502/20, 22, 38, 55, 313–315, 321
See application file for complete search history.

(56) References Cited

U.S. PATENT DOCUMENTS

| | | | | |
|---|---|---|---|---|
| 4,006,168 | A * | 2/1977 | Kerr .......................... | B01J 23/92 502/38 |
| 4,052,332 | A * | 10/1977 | D'Amore ............... | B01J 23/002 502/211 |
| 4,895,816 | A * | 1/1990 | Gardner ................. | C10G 65/04 502/10 |
| 5,280,004 | A * | 1/1994 | Iino ........................ | C10G 45/08 502/314 |
| 6,486,220 | B1 * | 11/2002 | Wright ................. | B01J 23/8896 502/20 |
| 8,128,811 | B2 * | 3/2012 | McCarthy ................ | B01J 23/85 208/208 R |
| 2002/0198096 | A1 * | 12/2002 | Wright ................. | B01J 23/8896 502/38 |
| 2003/0104926 | A1 * | 6/2003 | Eijsbouts ................. | B01J 23/94 502/29 |
| 2007/0275845 | A1 | 11/2007 | Jansen et al. | |
| 2009/0023822 | A1 * | 1/2009 | Tijm ...................... | C10G 2/342 518/715 |
| 2009/0258779 | A1 | 10/2009 | McCarthy et al. | |
| 2010/0105540 | A1 * | 4/2010 | Galliou .................... | B01J 23/85 502/28 |
| 2013/0165316 | A1 | 6/2013 | Guichard et al. | |
| 2014/0076780 | A1 | 3/2014 | Guichard et al. | |

FOREIGN PATENT DOCUMENTS

| | | |
|---|---|---|
| WO | 2005/035691 | 4/2005 |
| WO | 2009/126278 | 10/2009 |

OTHER PUBLICATIONS

International Search Report in respect to International Application No. PCT/EP2015/0583000, dated Jul. 7, 2015.

* cited by examiner

*Primary Examiner* — Patricia L. Hailey
(74) *Attorney, Agent, or Firm* — Greenblum & Bernstein, P.L.C.

(57) ABSTRACT

The invention refers to a process for rejuvenating a hydrotreating catalyst comprising a group VIB hydrogenation metal and/or a group VIII hydrogenation metal, which comprises the steps of: (a) regenerating the catalyst by contacting said catalyst with an oxygen containing gas at a temperature from about 300° C. to 550° C. to obtain a regenerated carbon-reduced catalyst, (b) impregnating the regenerated carbon-reduced catalyst with a solution which consists of a mixture of water and citric acid, (c) aging the impregnated catalyst for at least 6 hours and (d) drying the aged catalyst. The invention also refers to the rejuvenated catalyst obtained and its use for hydrotreating hydrocarbon feedstocks.

17 Claims, No Drawings

PROCESS FOR REJUVENATING HYDROTREATING CATALYSTS

TECHNICAL FIELD

The present invention generally relates to a process for rejuvenating hydrotreating catalysts, the resulting catalyst obtained through this process and its use in hydrotreating process.

BACKGROUND ART

The hydrocarbon feedstocks, the raw materials used in petroleum refining industry, need to be refined before they can be used in numerous products and processes. A large part of the hydrocarbon feedstocks are submitted to a so called hydrotreating process. The purpose of hydrotreating is to reduce the amounts of impurities in the hydrocarbon feedstocks.

In particular, hydrotreating aims the removal of sulfur and nitrogen compounds.

The hydrocarbon feedstocks often contain sulfur and nitrogen compounds. These compounds are responsible of the release of sulfur oxides and nitrogen oxides in the atmosphere when the hydrocarbon products are used as fuel and burnt. These sulfur oxides and nitrogen oxides are considered harmful for the environment. As a consequence, national and international regulators are continuously imposing lower nitrogen and sulfur contents in fuel so as to reduce pollution of the environment by reducing as much as possible the quantities of these compounds when the fuel is burnt. There is thus an increased need to develop more efficient hydrotreating processes.

The efficiency of hydrotreating process relies in part on the activity of hydrotreating catalysts used. These catalysts allow converting feedstocks into useable materials. Nevertheless, during use, the activity of the hydrotreating catalysts decreases. The resulting spent catalysts may thus be used in less demanding kinds of hydrotreating processes after they are at least regenerated.

However, the regenerated catalysts do not show as high activity as the original catalysts due to agglomerates of the catalyst metals formation.

Numerous processes have been developed in order to reactivate the spent catalysts such as for example the so called rejuvenation process. The rejuvenation aims to restore the original activity of the catalysts or at least an activity superior to the one obtained after a simple regeneration step. However, the efficiency of the rejuvenation process may depend on several parameters such as: the catalyst to be treated, the operational conditions of the process or the rejuvenating agent used.

Thus, there is still a need to develop efficient and easy to implement processes for restoring the activity of the spent catalysts.

Technical Problem

It is an object of the present invention to provide an efficient and easy to implement process for rejuvenating hydrotreating catalysts.

This object is achieved by a process for rejuvenating hydrotreating catalysts as defined in below.

GENERAL DESCRIPTION OF THE INVENTION

In order to overcome the above-mentioned problem, the present invention provides a process for rejuvenating a hydrotreating catalyst comprising a group VIB hydrogenation metal and/or a group VIII hydrogenation metal, which comprises the steps of:
   a) regenerating the catalyst by contacting said catalyst with an oxygen containing gas at a temperature from about 300° C. to 550° C. to obtain a regenerated carbon-reduced catalyst wherein the content of carbon at the end of the regeneration step a) is inferior to 0.5 wt % based on the total weight of the catalyst,
   b) impregnating the regenerated, carbon-reduced catalyst with a solution which consists of a mixture of water and citric acid,
   c) aging the impregnated catalyst for at least 14 hours at room temperature and
   d) drying the aged catalyst wherein the process uses citric acid in water without any further organic additive. The impregnation solution consists of a combination of water and a rejuvenating agent which is: citric acid, excluding any other compounds.

In fact, citric acid alone has already been tested as an agent for rejuvenating catalysts, however the tests were not successful.

Indeed, patent application WO2005035691 discloses a process for rejuvenating a hydrotreating catalyst comprising a group VIB metal oxide and a group VIII metal oxide. This process comprises the step of contacting the hydrotreating catalyst with an acid and an organic additive which has a boiling point in the range of 80° C.-500° C. and a solubility in water of at least 5 grams per liter. In particular, the acid may be an organic acid such as citric acid among other possibilities (see page 9 line 31 of WO2005035691 publication).

Patent application WO2005035691 provides comparative experiments 1-3 and examples 4-8 according to the described process. Comparative example 2 (CE2) refers to the reactivation of a regenerated catalyst with citric acid (5 wt % relative to the catalyst weight—aging time 2 h at 60° C.). Examples 4-8 concern impregnation solutions comprising the combination of an organic acid with an organic additive. In particular, examples 4-8 involve the use of solution comprising combination of citric acid and polyethylene glycol, acetic acid and polyethylene glycol, or citric acid and glycerol.

For each of these reactivated catalysts, the relative volume activity (RVA) has been measured. However, the RVA measured for citric acid (CE2), namely 46, is disappointing since it is only slighter higher than the RVA measured for the regenerated catalysts CE1. In contrast, examples 4-8 which concern the use of a combination of organic acid and organic additive show satisfying RVA, especially examples 5 and 8 using high concentration of acid and organic additive, which show RVA of 76 and 97.

Thus, patent application WO2005035691 teaches that the single use of citric acid and water does not lead to recover the catalytic activity of the regenerated catalyst. In fact, patent application WO2005035691 points out that it is necessary to at least combine citric acid with another organic additive in order to obtain satisfying results. The teaching and especially the experimental data disclosed in patent application WO2005035691 strongly discourage to use the citric acid alone for rejuvenating catalysts.

Surprisingly and contrary to the teaching of patent application WO2005035691, the inventors have now determined that it is possible to use citric acid in water without any organic additive in a process for recovering the catalytic activity of a catalyst. Even more surprisingly, the inventors have now demonstrated a method that returns the rejuvenated catalyst to activity levels well in excess of the fresh catalyst activity.

Indeed, several spent catalysts have been submitted to the process according to the invention, which involves the use of impregnation solution consisting of water and citric acid. For each rejuvenated catalyst using the present process, the RVA has been measured. The RVA measured for these rejuvenated catalyst are comprised between 94 and 116 whereas the RVA measured in the test disclosed in patent application WO2005035691 is only 46. In fact, the RVA of the rejuvenated catalyst obtained through the process according to the present invention are more than 2 times superior to the one described in patent application WO2005035691. Some of the rejuvenated catalysts perform even better that the fresh catalyst which is unheard of in the industry.

Thus, the inventors have developed a process wherein the rejuvenating agent consists in citric acid (in water) only and which leads to a significant improvement of the activity of the catalyst. Without being bound by any theory, the improvement of the activity of the catalyst seems to be due to:

The formation of a stable complex with the promoters (Co, Ni);
The improvement of the dispersion of $MoO_3$ on the support surface by a forming Molybdenum citrate complex, as observed by electronic microscopy;
The dissolution of undesirable $CoMoO_4$ or $NiMoO_4$ crystalline phases as observed by X-ray diffraction.

The hydrotreating catalyst to be used in this process may be an additive or a non-additive based catalyst.

The term "additive based catalyst" refers to a catalyst wherein an organic additive has been included therein prior to its use in the hydrotreating process of a hydrocarbon feedstock or prior to a presulfurization treatment performed before the use in the hydrotreating process. Organic additive refers to any organic compound having at least one heteroatom in its chemical structure. Heteroatom results when an atom other than carbon or hydrogen is bound to carbon. Typically, heteroatoms include Nitrogen, Oxygen, Sulfur, Phosphorus, Chlorine, Bromine and Iodine. Examples include carboxylic acids (citric acid, tartaric acid, acetic acid etc), (poly)ether (polyethyleneglycol, dipropyleneglycol etc), sugars (glucose, fructose etc), N-containing compounds (Monoethanolamine, EDTA, DTPA etc) and S-containing compounds (dimercaprol, dimercaptosuccinic acid etc) The term "non additive-based catalyst" refers to a catalyst wherein no organic additive has been included prior to its use in the hydrotreating process of a hydrocarbon feedstock or prior to a presulfurization treatment performed before the use in the hydrotreating process.

The initial concentration of carbon of the spent hydrotreating catalyst (namely before being submitted to the process according to the present invention) may for example be comprised from 5 wt % to 25 wt % based on the total weight of the hydrotreating catalyst before being submitted to the process for rejuvenating.

The additive or non-additive based catalyst also comprises a group VIB hydrogenation metal. The group VIB hydrogenation metal may be chosen among chromium, molybdenum, or tungsten. Preferably, the group VIB hydrogenation metal is molybdenum. The concentration of group VIB hydrogenation metal is preferably between 5 wt % and 25 wt % and more preferably between 10 wt % and 20 wt % based on the total weight of the catalyst, the amount of group VIB hydrogenation metal being expressed as element and not as oxide for example, when group VIB hydrogenation metal is Mo, the concentration is expressed as wt % of Mo instead of wt % of $MoO_3$.

The additive or non-additive based catalyst also comprises a group VIII hydrogenation metal. The group VIII hydrogenation metal may be preferably selected in the group consisting of iron, cobalt and nickel. In particular, the group VIII hydrogenation metal may be either cobalt and/or nickel. Advantageously, the amount of group VIII hydrogenation metal is comprised from 1 wt % to 8 wt % and more advantageously from 3 wt % to 5 wt % based on the total weight of catalyst, the concentration of group VIII hydrogenation metal being expressed as element and not as oxide.

The additive or non-additive based catalyst may also comprise additional components such as for example, halogens, boron and/or phosphorus. The additive or non-additive based catalyst may comprise for example from 0.5 wt % to 1 wt % of boron and in a more preferred way is about 0.8 wt % of boron based on the total weight of the catalyst, the concentration of boron being expressed as element (expressed as B) and not as oxide.

According to an embodiment, the additive or non-additive based catalyst comprises from 0.5 to 8 wt % and preferably from 0.8 to 5 wt % of phosphorus based on the total weight of the catalyst, the concentration of phosphorus being expressed as element (expressed as P) and not as oxide.

The additive or non-additive based catalyst may also comprise a carrier or support, preferably a porous carrier. Such catalysts are often called supported catalysts. The support portion of the supported catalyst can be comprised of any of the conventional metal oxides, such as alumina, silica, silica-alumina, magnesia, titania, zirconia, or mixtures thereof. Alumina is preferred. The support portion of the catalyst can have any convenient shape, such as spheres, pellets, or extrudate shapes.

Preferably, the total pore volume of the porous carrier or support may be in the range of from about 0.2 cc/g to about 2 cc/g. Advantageously, the surface area of the alumina support, measured by the B.E.T. (Brunauer-Emmett-Teller) method, may be in the range of from about 100 to about 400 $m^2/g$.

The initial hydrotreatment causes the supported catalyst to become a spent or partially spent catalyst, due at least in part to the presence of coke on the spent or partially spent catalyst.

Preferably, spent or partially spent catalysts prior to rejuvenation have only a moderate level of coke, such as less than about 15 wt %, or less than about 20 wt %. After rejuvenation according to the invention, the supported catalyst can preferably have at least about 70% of the surface area and crush strength of the corresponding fresh catalyst.

Before being submitted to the process for rejuvenating, the additive or non-additive based spent or partially spent catalyst may be previously treated by stripping (before step a) of the process). This optional step of stripping allows removing the volatile hydrocarbons retained on the catalyst. The catalyst is contacted with a hot steam or gas, diluted air, natural gas combustion products or nitrogen, at a temperature comprised from 150 and 450° C. or even from a 150° C. to 550° C.

Step a) of the process according to the present invention refers to the regeneration of the additive or non-additive based catalyst. The regeneration step is carried out by contacting said catalyst with an oxygen containing gas at a temperature comprises from 300° C. to 550° C. and preferably between 400° C. and 500° C. Preferably, the oxygen-containing gas may be air and the oxygen concentration may be for example between 10 and 21% vol. Preferably, the regeneration step may be performed until the content of carbon of the catalyst decreases below 0.5 wt % based on the total weight of the catalyst. According to an embodiment of the invention, the hydrotreating catalyst after the regeneration step a) may for example comprise a content of carbon inferior or equal to 0.4 wt %; inferior or equal to 0.3 wt %; inferior or equal to 0.2 wt %; or inferior or equal to 0.1 wt % based on the total weight of the catalyst. According to an embodiment of the invention, the content of carbon of the hydrotreating catalyst after the regeneration step a) may for example be superior or equal to 0; superior or equal to 0.1 wt %; superior or equal to 0.2 wt %; superior or equal to 0.3 wt %; or superior or equal to 0.4 wt % based on the total weight of the catalyst.

Preferably, the percentage of carbon may be inferior to 0.5 wt % after the regeneration step a). The catalyst obtained at the end of the regeneration step shows an activity which may be for example between 75 to 90% versus fresh. The regeneration step generally takes place in a moving belt or a rotary kiln. At the end of the oxidative regeneration, metals supported on carrier are obtained.

The regenerated carbon-reduced catalyst is then submitted to an impregnation step. In fact, the catalyst is contacted with an aqueous solution. This impregnation solution consists in a mixture of water and citric acid. According to an embodiment, the impregnation solution comprises from 5 to 20 wt % of citric acid in water.

According to an embodiment, the impregnation solution consists of:
  5 to 20 wt % of citric acid, and
  80 to 95 wt % of water, provided that the sum of these components are 100 wt %.

The impregnation of the carbon-reduced catalyst with this impregnation solutions leads to the rejuvenation of said catalyst. The impregnation of the catalyst is preferably carried out up to the total pores saturation of the catalyst, i.e. until the pores are substantially filled with the impregnation solution.

Citric acid is a weak organic acid with the formula $C_6H_8O_7$. According to an embodiment, the concentration of citric acid is comprised from 0.05 mol of citric acid/mol of hydrogenation metals to 0.15 mol of citric acid/mol of hydrogenation metals and preferably is about 0.15 mol of citric acid/mol of hydrogenation metals. This citric acid concentration is based on the hydrogenation metals of the regenerated catalyst, after the regeneration and prior to the rejuvenation process.

The impregnated catalyst is then aged in step c) for at least 14 hours and in particular for at least 16 hours. The aging time may also last preferably for at least 24 hours, more preferably for at least 40 hours, and even more preferably for at least 96 hours. The aging step is preferably performed at room temperature. During the aging, an exothermic reaction occurs and the temperature of the catalyst may increase up to 50° C. or even more. Usually there is not external heating/cooling of the catalyst during aging. Preferably, the end of the aging occurs when the undesirable crystalline phases such as $CoMoO_4$ and $NiMoO_4$ have disappeared. Those crystalline species can be easily monitored by XRD (X-rays Diffraction). According to an embodiment, the aging time does not exceed 504 hours, preferably does not exceed 336 hours and more preferably does not exceed 168 hours.

After the aging step, the resulting catalyst is then dried in order to remove at least a part of the water, preferably at least 80 wt % of the water, and more preferably at least about 85 wt % of the water based on the catalyst weight. The drying step is preferably performed at a temperature comprised from 80° C. to 300° C., preferably form 80° C. to 200° C., more preferably from 100° C. to 150° C., and most preferably is about 120° C. Generally, the drying step is carried out until a residual loss on ignition below 15 wt % based on the catalyst weight is reached. This parameter can be measured. This step may last for example about one hour. If the catalyst is dried at temperatures above the decomposition temperature of citric acid, i.e. >175 C, water as well as citric acid will be removed during that step. At drying temperatures above, water will be completely removed and up to 25% of citric acid could be also be removed during the drying step.

The process may also comprise an optional step e), which consists in sulfurizing the rejuvenated catalyst obtained. The sulfidizing step is performed after the step of drying d). Indeed, before being used in hydrotreating, the catalysts are generally sulfided in order to convert the hydrogenation metals into their sulfides.

The catalysts, obtained through the rejuvenation process, show a better, higher catalytic activity than the regenerated catalyst and even in certain cases an activity which is superior to that of the fresh catalysts (namely catalysts which have never been used). The fact a rejuvenation process of a spent hydrotreating catalysts allows to obtain a rejuvenated catalyst which shows a higher activity than the fresh catalyst is unexpected and unheard of. This even more so because the prior art, as explained above, showed activities of rejuvenated catalysts of 46% as compared to fresh catalysts.

An aspect of the present invention also concerns the rejuvenated catalyst obtained through the process for rejuvenating and its use for hydrotreating process. In particular, a process for hydrotreating hydrocarbon feedstocks in which a hydrocarbon feedstock is contacted under hydrotreating conditions with a rejuvenated catalyst obtained through the rejuvenation process according to the present invention.

All the embodiments previously mentioned may be combined within reason.

EXAMPLES

Example 1: Rejuvenating Used Catalyst with Citric Acid

The following non-additive based catalysts: Commercial CoMo catalyst 1 (TK-576 BRIM), Commercial NiMo catalyst 1 (HR-538) and Commercial CoMo catalyst 2 (DC-2532), have been treated with the rejuvenation process according to the present invention. First, the catalysts have been stripped to remove hydrocarbon, then regenerated at a temperature which is between 400 and 450° C. under air atmosphere, to remove carbon and sulfur to achieve a carbon content less than 0.5 wt %. After oxidative regeneration, metals supported on alumina carrier are obtained.

The physical/chemical properties of the regenerated materials are as follows:

|  | Commercial CoMo catalyst 1 | Commercial NiMo catalyst 1 | Commercial CoMo catalyst 2 |
| --- | --- | --- | --- |
| Carbon content (wt %) | 0.34 | 0.05 | 0.16 |
| Sulfur content (wt %) | 0.52 | 0.21 | 0.34 |
| Surface area ($m^2/g$) | 196 | 202 | 199 |

-continued

|  | Commercial CoMo catalyst 1 | Commercial NiMo catalyst 1 | Commercial CoMo catalyst 2 |
|---|---|---|---|
| Water Pore Volume (cc/g) | 0.465 | 0.578 | 0.567 |
| LOI at 485° C. (wt %) | 1.81 | 0.67 | 1.09 |
| Cobalt content (wt %) | 3.55 | — | 3.10 |
| Molybdenum content (wt %) | 14.68 | 10.84 | 10.85 |
| Nickel content (wt %) | — | 2.28 | 0.56 |
| Phosphorus content (wt %) | — | 2.51 | 2.16 |
| Boron content (wt %) | 0.82 | — | — |

The regenerated catalysts have been impregnated with citric acid at 0.15 mol/mol of hydrogenation metals, in aqueous solution, up to total pores saturation. The concentration of citric acid in water, namely the concentration of citric acid in impregnation solution used to impregnate the regenerated catalyst is: 12.0 citric acid wt % for COMMERCIAL CoMo CATALYST 1; 7.1 citric acid wt % for Commercial NiMo catalyst 1 and 8.3 citric acid wt % for Commercial CoMo catalyst 2. Then, the regenerated-impregnated catalysts have been aged for at least 16 hours at room temperature to obtain aged-impregnated catalysts. The aged-impregnated catalysts have been dried at 120° C. during 1 hour to obtain rejuvenated catalysts.

The activities of regenerated and rejuvenated Commercial CoMo catalyst 1 catalyst have been checked with SRGO+ feedstock using the following operational conditions: Pressure=30 bar; LHSV (Liquid Hourly Space Velocity)=1.5 hr−1; $H_2$/Oil=sl/l; WABT (Weighted Average Bed Temperature)=350° C.

The activities of regenerated and rejuvenated Commercial NiMo catalyst 1 have been checked with SRGO+ feedstock using the following operational conditions: Pressure=35 bar; LHSV=1.3 hr−1; $H_2$/Oil=200 sl/l; WABT=335 to 355° C.

The activities of regenerated and rejuvenated Commercial CoMo catalyst 2 catalyst have been checked with SRGO+ feedstock using the following operational conditions: Pressure=41.4 bar; LHSV=1.5 hr−1; $H_2$/Oil=214 sl/l; WABT=343° C.

The composition of SRGO+ feedstock is:

| SULFUR | MG/KG | 8920 |
|---|---|---|
| NITROGEN BASIC | MG/KG | 26.0 |
| NITROGEN | MG/KG | 50 |
| DENSITY AT 25° C. | G/ML |  |
| DENSITY AT 15° C. | G/ML | 0.8388 |
| HYDROGEN | WT % |  |
| MONO-AROMATICS | WT % | 15.8 |
| DI-AROMATICS (DAH) | WT % | 9.7 |
| TRI+-AROMATICS (T + AH) | WT % | 0.5 |
| BROMINE NUMBER | G/100 G | 1.1 |

The hydrodesulfurization relative volume activity has been measured for every rejuvenated catalyst. The following results have been obtained.

|  | Commercial CoMo catalyst 1 | Commercial NiMo catalyst 1 | Commercial CoMo catalyst 2 |
|---|---|---|---|
| Fresh catalyst | 100% | 100% | 100% |
| Regenerated catalyst | 85% | 85% | 91% |
| Example 1 (according to the invention) | 94% | 109% | 116% |

The activity results are expressed as percentage of fresh catalyst. These results prove that the rejuvenated catalysts are more efficient than the regenerated ones and even more efficient than the fresh ones in term of hydrodesulfurization (HDS) activity, in particular for the Commercial NiMo catalyst 1 and Commercial CoMo catalyst 2 for which the activities are superior to 100%.

Example 2: Additional Results

Several catalysts have been rejuvenated with the process according to the present invention: (Commercial CoMo catalyst 3 (DC 2118) and Commercial NiMo catalyst 2 (DN 3110). The hydrodesulfurization relative volume activity (HDS-RVA) has been measured for each rejuvenated catalyst prepared.

The compositions of the hydrotreating catalysts 2.1 to 2.2 tested are the followings:

| Examples | Catalyst type | Mo content (wt %) | Co content (wt %) | Ni content (wt %) | P content (wt %) | B content (wt %) |
|---|---|---|---|---|---|---|
| 2.1 | Commercial CoMo catalyst 3 | 14.47 | 4.32 | 0.77 | 2.33 | — |
| 2.2 | Commercial NiMo catalyst 2 | 14.47 | — | 4.89 | 2.17 | — |

The content of carbon of catalysts of examples 2.1 and 2.2 after regeneration is for both of examples 2.1 and 2.2 is: 0.06 wt % based on the total weight of the catalyst.

These hydrotreating catalysts have been submitted to the impregnation step (after the regeneration step) according to the following conditions:

| Examples | Agent of the impregnating solution | Concentration (mol/mol of hydrogenation metals) | Drying temperature (° C.) | Aging time (hours) |
|---|---|---|---|---|
| 2.1 | Citric acid | 0.15 | 120 | >16 |
| 2.2 | Citric acid | 0.20 | 120 | >40 |

The concentration of citric acid in water used as impregnation solution for example 2.1 is 13.7 citric acid wt % and for example 2.2 is 13.0 citric acid wt %.

The rejuvenated catalysts 2.1 and 2.2 obtained have been tested on MELGO feedstock.

The composition of MELGO feedstock is the following:

| SULFUR | MG/KG | 11000 |
|---|---|---|
| NITROGEN BASIC | MG/KG | 44.0 |
| NITROGEN | MG/KG | 120 |
| DENSITY AT 25° C. | G/ML |  |
| DENSITY AT 15° C. | G/ML | 0.8534 |
| HYDROGEN | WT % |  |

-continued

| | | |
|---|---|---|
| MONO-AROMATICS | WT % | 17.1 |
| DI-AROMATICS (DAH) | WT % | 11.5 |
| TRI+-AROMATICS (T + AH) | WT % | 1.0 |
| POLYCYCLIC AROMATIC | WT % | 12.5 |
| TOTAL AROMATICS | WT % | 29.6 |
| BROMINE NUMBER | G/100 G | 1.0 |

The testing conditions of the catalysts 2.1 to 2.2 on MELGO feedstock are: Pressure=41.4 bar; LHSV=1.00 hr−1; $H_2$/Oil=214 sl/l; WABT=354.5° C.

In particular, the hydrodesulfurization relative volume activity (HDS-RVA) has been measured for each rejuvenated catalyst prepared.

The results obtained are:

| Examples | HDS-RVA (%) |
|---|---|
| 2.1 | 95 |
| 2.2 | 111 |

The rejuvenated catalysts show excellent percentage of HDS-RVA. In certain cases, these percentages are even superior than 100 which means that the activity of the rejuvenated catalyst is superior than the fresh catalyst. Thus, the rejuvenated catalysts have recovered a catalytic activity superior to the fresh catalysts.

Influence of Drying Temperature

A catalyst, Commercial NiMo catalyst 3 (DN-3551), (Mo=14.5 wt %, Ni=3.6 wt %, P=2.2 wt %) has been rejuvenated using citric acid (CA) in water at a concentration of 0.15 mol CA/mol hydrogenation metal and aged for 16 h.

It has been found that the higher drying temperature lead to better results indeed the activity of the rejuvenated catalyst is higher at 220° C. than at 120° C. (temperature measured in the catalyst).

| Drying temperature (° C.) | HDS-RVA (%) |
|---|---|
| 120 | 116 |
| 220 | 122 |
| 300 | 110% |

Influence of Aging

A catalyst, Commercial NiMo catalyst 4 (DN-3100), (Mo=12.5 wt %; Ni=3.1 wt %; P=3.1 wt %) has been submitted to the process as described above using different aging times:

It has been found that an aging time of less than 4 h does not lead to acceptable results indeed the activity of the rejuvenated catalyst remains well below the activity of a new catalyst (100% Activity), whereas longer aging times lead to a much higher activity of the catalyst.

| Aging time (h) | HDS-RVA (%) |
|---|---|
| 2 | 77 |
| 4 | 82 |
| 72 | 105 |

The invention claimed is:

1. A process for rejuvenating a hydrotreating catalyst comprising a group VIB hydrogenation metal and/or a group VIII hydrogenation metal, which comprises:
   a) regenerating the catalyst by contacting said catalyst with an oxygen containing gas at a temperature from 300° C. to 550° C. to obtain a regenerated carbon-reduced catalyst, wherein the content of carbon at the end of the regeneration is less than 0.5 wt % based on the total weight of the catalyst,
   b) impregnating the regenerated carbon-reduced catalyst with a solution which consists of a mixture of water and citric acid,
   c) aging the impregnated catalyst for at least 14 hours at room temperature and
   d) drying the aged catalyst
   wherein the process uses citric acid in water without any further organic additive.

2. The process according to claim 1, wherein the temperature of the drying is from 80° C. to 300° C.

3. The process according to claim 2, wherein the temperature of the drying is about 120° C.

4. The process according to claim 1, wherein the concentration of the citric acid is comprised from 0.05 mol of citric acid/mol of hydrogenation metals to 0.5 mol of citric acid/mol of hydrogenation metals based on the hydrogenation metals of the regenerated catalyst, after the regeneration and prior to the aging and the drying.

5. The process according to claim 1, wherein the solution consists of:
   5 to 20 wt % of citric acid, and
   80 to 95 wt % of water,
   provided that the sum of these components is 100 wt %.

6. The process according to claim 1, wherein the hydrotreating catalyst is an additive based catalyst, wherein an organic additive has been included therein prior to its use in the hydrotreating process of a hydrocarbon feedstock or prior to a presulfurization treatment performed before the use in the hydrotreating process or a non-additive based catalyst wherein no organic additive has been included prior to its use in the hydrotreating process of a hydrocarbon feedstock or prior to a presulfurization treatment performed before the use in the hydrotreating process.

7. The process according to claim 1, wherein the hydrotreating catalyst, before being submitted to the process, comprises: from 10 to 20 wt % of group VIB hydrogenation metal and/or from 3 to 5 wt % group VIII hydrogenation metal, the concentrations being expressed as element.

8. The process according to claim 1, wherein the group VIB hydrogenation metal is molybdenum.

9. The process according to claim 1, wherein the group VIII hydrogenation metal is cobalt or nickel or a mixture thereof.

10. The process according to claim 1, wherein the hydrotreating catalyst comprises halogens, phosphorus and/or boron.

11. The process according to claim 1, wherein the hydrotreating catalyst comprises a porous carrier which comprises alumina.

12. The process according to claim 1, wherein the catalyst is contacted with a hot steam or gas, diluted air, natural gas combustion products or nitrogen at a temperature from 150 to 550° C. prior to the regenerating of the catalyst.

13. The process according to claim 1, wherein the process comprises sulfurizing after the drying the aged catalyst.

14. The process according to claim 1, wherein the aging time of the impregnated catalyst lasts for at least 16 hours.

15. The process according to claim 1, wherein the aging time of the impregnated catalyst does not exceed 504 hours.

16. The process according to claim 15, wherein the aging time of the impregnated catalyst does not exceed 336 hours.

17. The process according to claim 16, wherein the aging time of the impregnated catalyst does not exceed 168 hours.

\* \* \* \* \*